(12) United States Patent
Yang

(10) Patent No.: US 12,257,753 B2
(45) Date of Patent: Mar. 25, 2025

(54) EJECTING APPARATUS OF INJECTION MOLDING MOLD

(71) Applicants: Hyundai Motor Company, Seoul (KR); Kia Corporation, Seoul (KR)

(72) Inventor: Weonseok Yang, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 124 days.

(21) Appl. No.: 18/192,443

(22) Filed: Mar. 29, 2023

(65) Prior Publication Data

US 2024/0042662 A1 Feb. 8, 2024

(30) Foreign Application Priority Data

Aug. 8, 2022 (KR) .................. 10-2022-0098503

(51) Int. Cl.
*B29C 45/40* (2006.01)
(52) U.S. Cl.
CPC .. *B29C 45/4005* (2013.01); *B29C 2045/4057* (2013.01)
(58) Field of Classification Search
CPC ... B29C 45/40; B29C 45/401; B29C 45/4005; B39C 2045/4057; B39C 2045/4063; B39C 2045/4078; B39C 2045/4094
See application file for complete search history.

(56) References Cited

U.S. PATENT DOCUMENTS

| | | | | |
|---|---|---|---|---|
| 3,893,644 | A * | 7/1975 | Drazick | B29C 45/4005 425/444 |
| 6,206,682 | B1 * | 3/2001 | Vovan | B29C 45/4005 425/139 |
| 7,597,550 | B2 * | 10/2009 | Lee | B29C 45/40 425/444 |
| 8,721,323 | B2 * | 5/2014 | Chen | B29C 45/4005 425/436 RM |
| 2013/0052296 | A1 * | 2/2013 | Jeon | B29C 45/40 425/552 |
| 2014/0212610 | A1 * | 7/2014 | Arai | B29C 45/401 428/36.5 |
| 2019/0358875 | A1 * | 11/2019 | Fukuzawa | B29C 45/572 |

* cited by examiner

*Primary Examiner* — Thu Khanh T. Nguyen
(74) *Attorney, Agent, or Firm* — SLATER MATSIL, LLP

(57) ABSTRACT

An ejecting apparatus of an injection molding mold, including an ejecting plate on a lower die of the injection molding mold, the ejecting plate configured to be movable in a vertical direction, at least one main ejecting block coupled to a fixed core on the lower die, the at least one main ejecting block configured to be movable in the vertical direction and connected to the ejecting plate, a sub-ejecting block coupled to the at least one main ejecting block, the sub-ejecting block configured to be movable in the vertical direction, and an operating force applier coupled to the at least one main ejecting block and configured to apply operational force to the sub-ejecting block through at least one movable core slidably coupled to the fixed core and the ejecting plate.

14 Claims, 11 Drawing Sheets

EJECTING APPARATUS OF INJECTION MOLDING MOLD

CROSS-REFERENCE TO RELATED APPLICATIONS

This application claims priority to and the benefit of Korean Patent Application No. 10-2022-0098503 filed in the Korean Intellectual Property Office on Aug. 8, 2022, the entire contents of which are incorporated herein by reference.

TECHNICAL FIELD

The present disclosure relates to an injection molding mold.

BACKGROUND

In general, injection molding is a process in which plastic molten resin is injected into a mold to form a product with a preset shape. In particular, automotive parts such as bumper covers and door trims are manufactured by injection molding.

The molds used in the injection molding process include an upper mold and a lower mold. A cavity is formed between the upper and lower molds, which is the same shape as the product desired to mold. Thus, the plastic molten resin may be injected into the cavity, cooled within the cavity, and molded into the desired shape of the product.

The lower mold for this type of mold is equipped with an ejecting apparatus that is designed to take out the molded product. The ejecting apparatus includes an ejecting plate movably mounted in the vertical direction, and a plurality of main ejecting blocks mounted on the ejecting plate.

The ejecting apparatus further includes a sub-ejecting block (also known in the art as a "two-stage ejecting block") that is installed on each of the plurality of main ejecting blocks to be movable in the vertical direction.

Here, an ejecting rod that vertically penetrates the ejecting plate is connected to the sub-ejecting block. A hinged block that transmits the operating force to the ejection rod is rotatably mounted on the ejection plate. In addition, a guide rod that vertically penetrates the ejecting plate is installed at a lower portion of the molding core provided in the lower mold. The guide rod is configured to rotate the hinged block upward when the ejecting plate is raised.

The ejecting apparatus configured in this way raises the ejecting plate after the molding of the product has been completed, while the upper mold is raised. Then, the plurality of main ejecting blocks moves upward, thereby pushing the product upward.

At the same time, the guide rod rotates the hinged block upward. Then, the hinged block moves the ejecting rod upward. Accordingly, the sub-ejecting block moves upward, thereby pushing the protrusion molded part of the product (e.g., boss or hook) upward.

Thus, the plurality of ejecting blocks and sub-ejecting blocks can eject the product by pushing it upward from the molding core of the lower mold.

However, since the conventional ejecting apparatus is equipped with an ejecting rod and a guide rod that penetrate the ejecting plate, machining a penetration hole in the ejecting plate may cause an increase in the manufacturing cost and the manufacturing labor of the mold.

Furthermore, a conventional ejecting apparatus require an operating area for the ejection rod to be located within the lower mold, which can significantly deteriorate the design degree of freedom of the mold. This reduction in the design degree of freedom of the mold may be a disadvantage in achieving product ejection performance.

The above information disclosed in this background section is only for enhancement of understanding of the background of the invention, and therefore it may contain information that does not form the prior art that is already known to a person of ordinary skill in the art.

SUMMARY

The present disclosure relates to an injection molding mold. More particularly, the present disclosure relates to eject an injection molded product from the mold.

The present disclosure attempts to provide an ejecting apparatus of an injection molding mold capable of reducing the cost and labor of the mold, and improving design degree of freedom of the mold.

An ejecting apparatus of an injection molding mold may include an ejecting plate installed on a lower die of the injection molding mold to be movable in a vertical direction, at least one main ejecting block coupled to a fixed core provided on the lower die to be movable in the vertical direction, and connected to the ejecting plate, a sub-ejecting block coupled to the at least one main ejecting block to be movable in the vertical direction, and an operating force delivery unit installed on the at least one main ejecting block and configured to apply operational force to the sub-ejecting block through at least one movable core slidably coupled to the fixed core and the ejecting plate.

The operating force delivery unit may include a hinged block hinge-coupled to the at least one main ejecting block for swing by striking of the at least one movable core, the hinged block being in sliding contact with the sub-ejecting block.

The hinged block may be provided in a cam shape such that a rotational movement of the hinged block may be converted into linear movement of the sub-ejecting block in the vertical direction.

The at least one main ejecting block may be fixed to the ejecting plate through at least one connection rod.

The sub-ejecting block may be mounted on a mounting hole formed in the at least one main ejecting block.

A lower portion of the sub-ejecting block may protrude toward the hinged block through the mounting hole.

The at least one main ejecting block may include a hinge mount portion provided in a lower portion.

The hinged block may be rotatably coupled to the hinge mount portion through a hinge pin.

The sub-ejecting block may include a cam follower that is in sliding contact with the hinged block.

The hinged block may include a cam drive portion in a round shape in sliding contact with the cam follower.

The cam drive portion may include a first heat treated surface that is heat treated.

The hinged block may include a lever portion struck by a striking portion formed in the at least one movable core.

The lever portion may include a second heat treated surface that is heat treated.

The hinged block may be disposed in a locating space formed in the at least one movable core.

The ejecting plate may include a guide member to which at least one support rod connected to the at least one movable core is slidably coupled.

The at least one support rod may include a slide portion slidably coupled to the guide member such that the at least one movable core is slidably movable along a guide rail installed inclined on the fixed core.

The at least one movable core may be slidably coupled to the guide rail through a rail groove, and configured to move along an inclined surface formed on the at least one main ejecting block.

According to an embodiment, the cost and labor for manufacturing the injection molding mold may be reduced, and factory utilization rate and the mass productivity of the product may be improved.

Other effects that may be obtained or are predicted by an exemplary embodiment will be explicitly or implicitly described in a detailed description of the present invention. That is, various effects that are predicted according to an exemplary embodiment will be described in the following detailed description.

BRIEF DESCRIPTION OF THE DRAWINGS

The drawings are intended to be used as references for describing the exemplary embodiments of the present invention, and the accompanying drawings should not be construed as limiting the technical spirit of the present invention.

Figure 1:
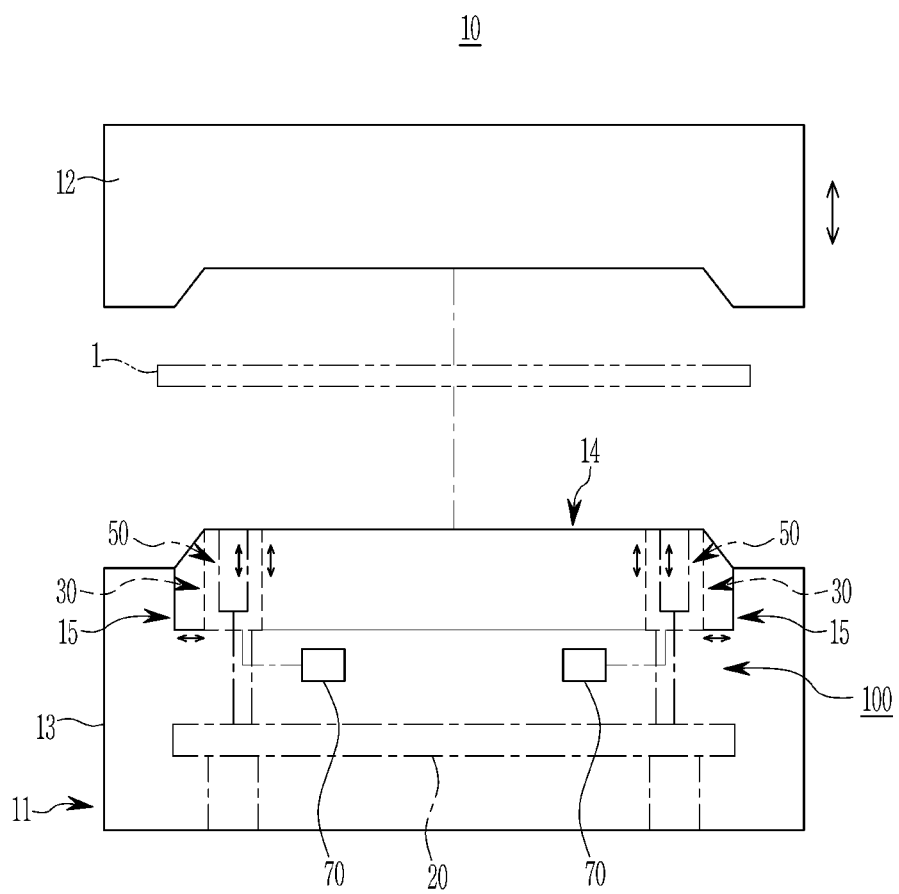
FIG. 1 is a block diagram schematically illustrating an injection molding mold applied with an ejecting apparatus of an injection molding mold according to an embodiment.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the embodiments of the present invention, parts that are not related to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited.

In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . portion", " . . . part", and " . . . member" described in the specification, mean a unit of a comprehensive element that performs at least one function or operation.

The terminology used herein is for the purpose of describing specific examples only and is not intended to be limiting of the disclosure. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items.

The term "coupled" or "connected" denotes a physical relationship between two components in which components are directly connected to each other or indirectly through one or more intermediary components.

Hereinafter, an example of the present disclosure is described in detail with reference to the accompanying drawing.

Figure 2:
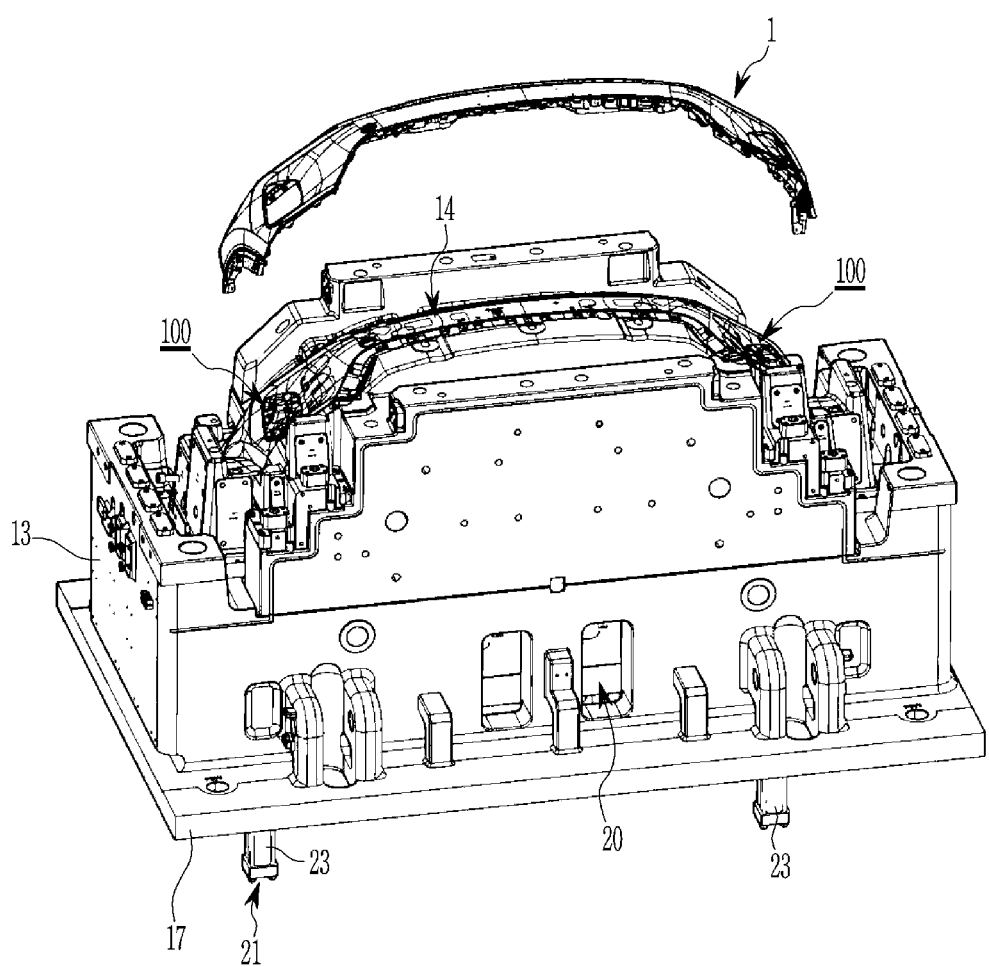
FIG. 2 is a perspective view of a lower die of an injection molding mold applied with an ejecting apparatus of an injection molding mold according to an embodiment.

FIG. 1 is a block diagram schematically illustrating an injection molding mold applied with an ejecting apparatus of an injection molding mold according to an embodiment. FIG. 2 is a perspective view of a lower die of an injection molding mold applied with an ejecting apparatus of an injection molding mold according to an embodiment.

Referring to FIG. 1 and FIG. 2, an ejecting apparatus 100 of an injection molding mold according to an embodiment may be applied to an injection molding mold 10 for injection molding a plastic molten resin into a preset shape.

In an example, the injection molding mold 10 may be applied to a process for manufacturing a product 1 of an automotive part, such as a bumper cover or door trim made of plastic material.

The injection molding mold 10 includes a lower die 11 and an upper die 12 installed to be movable in a vertical direction with respect to the lower die 11. The upper die 12 may reciprocally move in the vertical direction by the operation of a die driving source (not shown) known to a person skilled in the art, such as a motor, a hydraulic device, and the like. The upper die 12 may be pressed against (e.g., merged with) the lower die 11, or may be spaced away from (e.g., diverged from) the lower die 11. Here, a cavity in a desired shape of the product 1 is formed between the lower die 11 and the upper die 12.

Therefore, by the injection molding mold 10, the plastic molten resin injected into the cavity between the lower die 11 and the upper die 12 that are in tight contact may be formed to the product 1 of the preset shape.

Furthermore, in the injection molding mold 10, the lower die 11 includes a forming steel assembly (or molding core assembly) corresponding to the shape of the product 1. The forming steel assembly includes a fixed core 14 fixed to a die body 13 of the lower die 11, and at least one movable core 15 slidably coupled to the fixed core 14.

The at least one movable core 15 is configured to form an undercut to the product 1, and to avoid interference with the undercut when the product 1 is withdrawn (e.g., ejected). The structure and operation of the at least one movable core 15 will be later described in further detail.

The ejecting apparatus 100 of an injection molding mold according to an embodiment is configured to eject the product 1 completed with molding from the lower die 11 while the upper die 12 is spaced away from the lower die 11.

The ejecting apparatus 100 of an injection molding mold according to an embodiment is installed on the lower die 11 in the injection molding mold 10. The ejecting apparatus 100 of an injection molding mold according to an embodiment may firstly push the entire product 1 upward, and secondly push a protrusion molded part (e.g., boss or hook) of the product 1.

The ejecting apparatus 100 of an injection molding mold according to an embodiment is structured such that the manufacturing cost and labor of the injection molding mold 10 may be reduce, and the design degree of freedom of the injection molding mold 10 may be improved.

Figure 3:
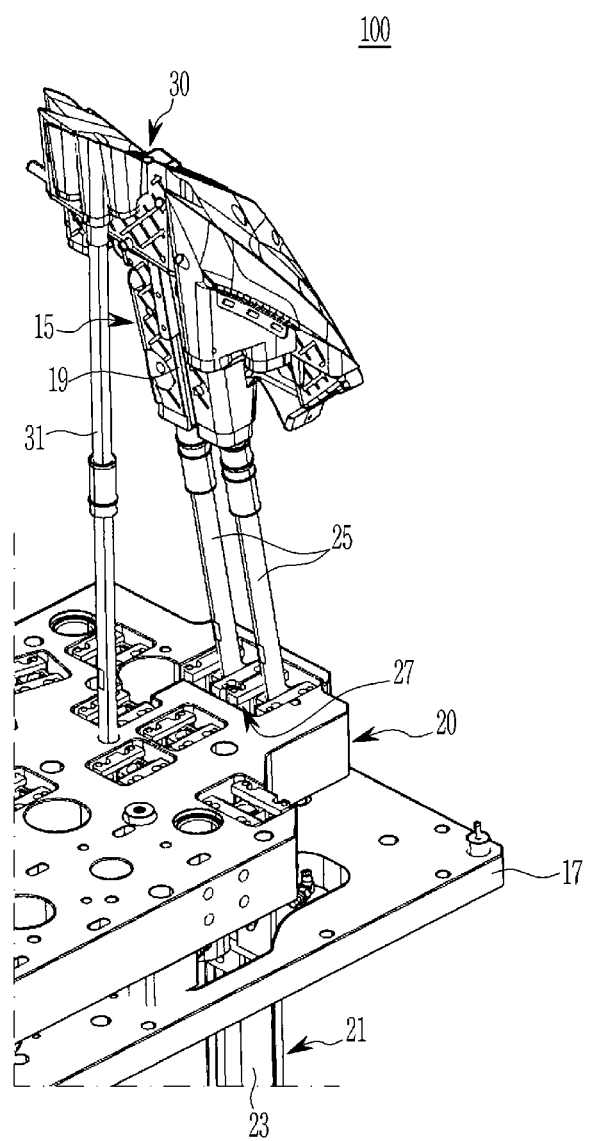
FIG. 3 and FIG. 4 are perspective views illustrating an ejecting apparatus of an injection molding mold according to an embodiment.
Figure 4:
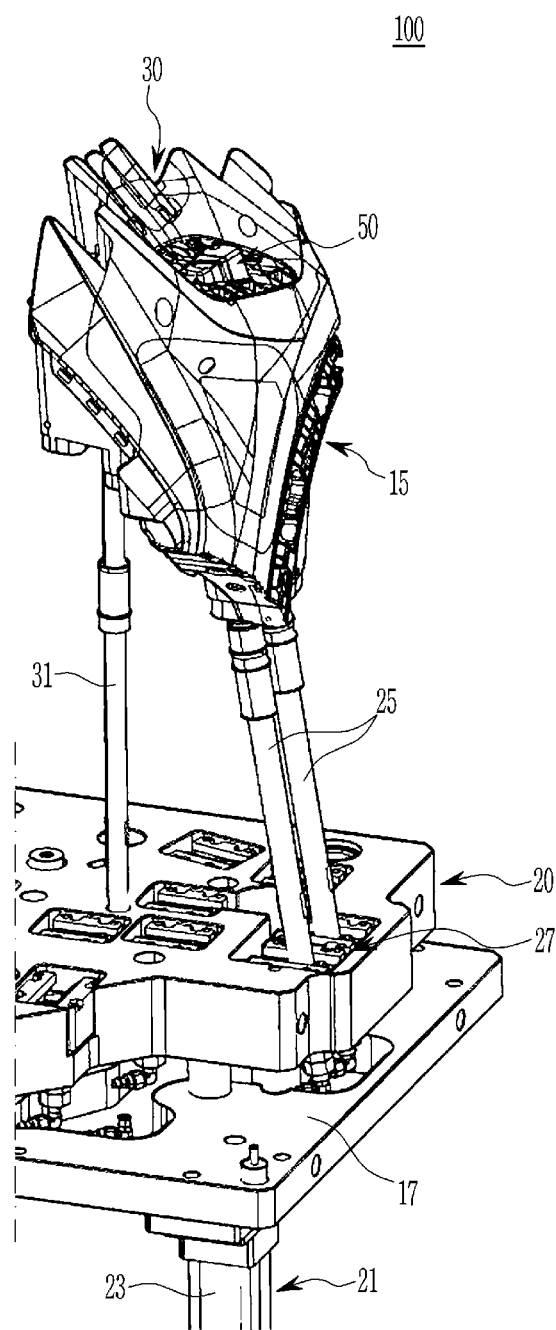
Figure 5:
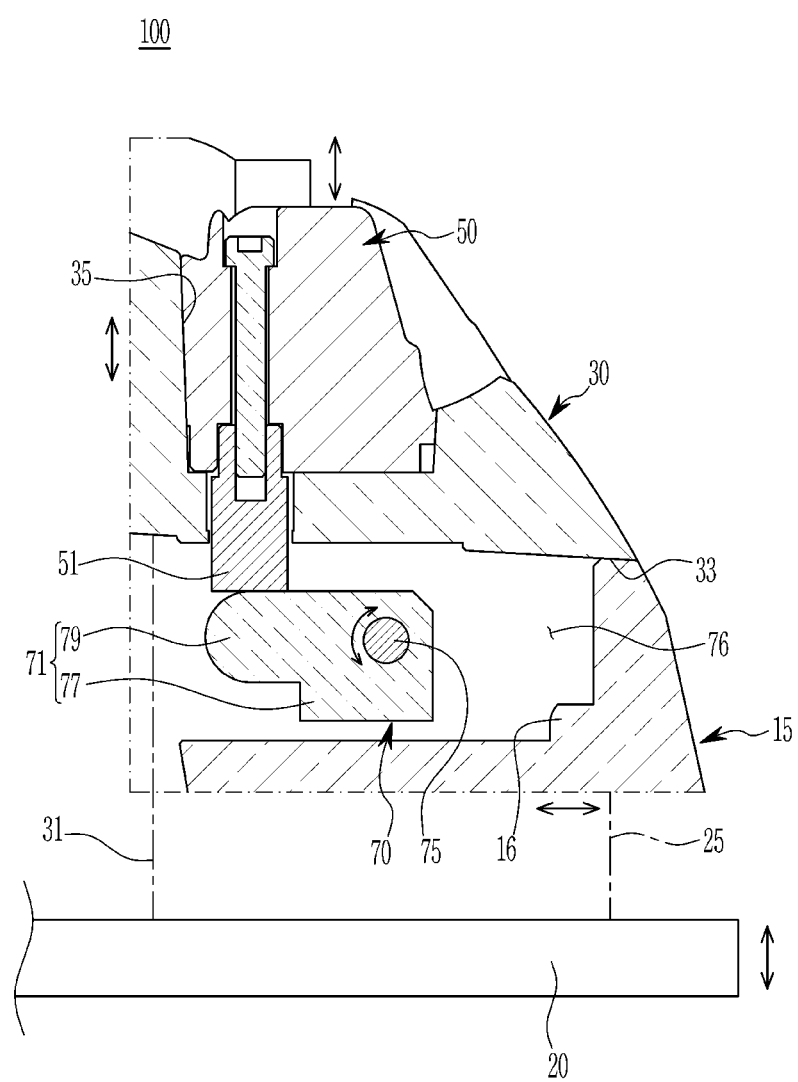
FIG. 5 is a cross-sectional view illustrating an ejecting apparatus of an injection molding mold according to an embodiment.

FIG. 3 and FIG. 4 are perspective views illustrating an ejecting apparatus of an injection molding mold according to an embodiment. FIG. 5 is a cross-sectional view illustrating an ejecting apparatus of an injection molding mold according to an embodiment.

Referring to FIG. 1 to FIG. 5, the ejecting apparatus 100 of an injection molding mold according to an embodiment includes an ejecting plate 20, at least one main ejecting block 3o, a sub-ejecting block 50, and an operating force delivery unit 70 (sometimes referred to as an operation force applier 70).

In an embodiment, in the lower die 11, the ejecting plate 20 is disposed on a lower side of the forming steel assembly, and installed on a die base 17 of the lower die 11 to be movable in the vertical direction.

The ejecting plate 20 may be moved in the vertical direction by the operation of an ejecting activator 21. In an example, the ejecting activator 21 may include at least one hydraulic pressure cylinder 23 known to a person skilled in the art. The at least one hydraulic pressure cylinder 23 is fixed to the die base 17, and is connected to the ejecting plate 20.

The ejecting plate 20 may vertically move, together with the at least one movable core 15 mentioned above. In addition, the at least one movable core 15 is slidably coupled to the ejecting plate 20 at a position corresponding to the fixed core 14.

Figure 6:
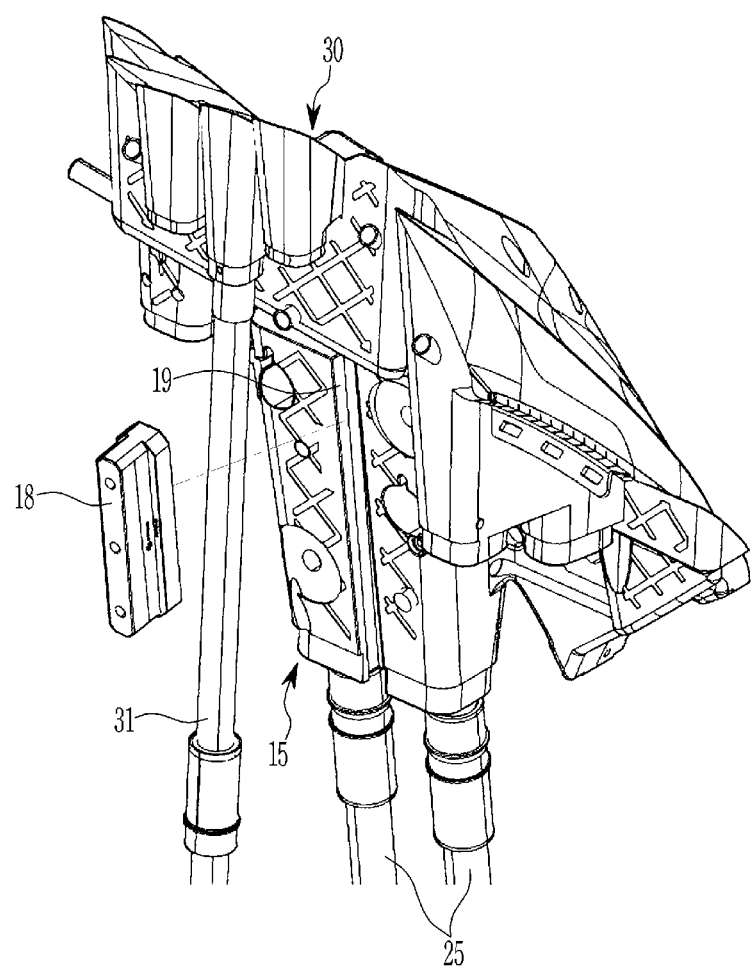
FIG. 6 and FIG. 7 illustrate a coupling structure of a movable core applied to an ejecting apparatus of an injection molding mold according to an embodiment.
Figure 7:
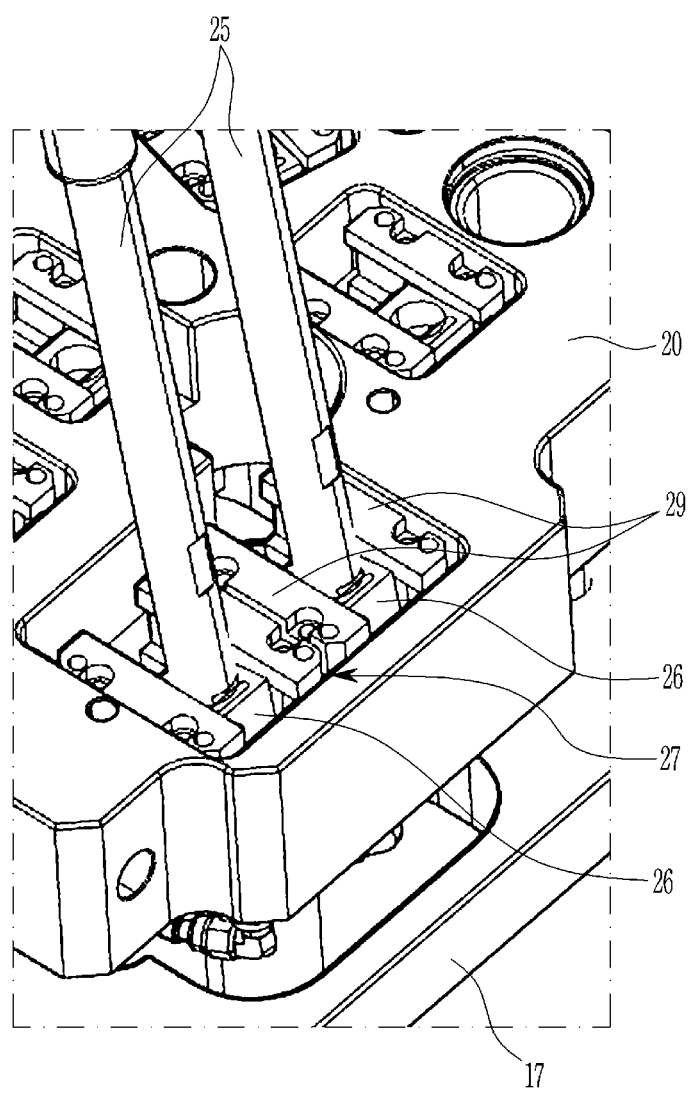

In addition, as shown in FIG. 6 and FIG. 7, the at least one movable core 15 may be slidably installed on a guide rail 18 installed inclined on the fixed core 14 at a preset inclination angle (e.g., 9°).

The at least one movable core 15 is slidably coupled to the guide rail 18 through a rail groove 19. The at least one movable core 15 may slide along the guide rail 18 in an inclined direction when the ejecting plate 20 moves in the vertical direction.

Furthermore, the at least one movable core 15 is slidably coupled to the ejecting plate through at least one support rod 25. The at least one support rod 25 is connected to the at least one movable core 15 through an upper portion, and slidably coupled to the ejecting plate through a lower portion.

For such a purpose, the ejecting plate 20 includes a guide member 27 to which the at least one support rod 25 is slidably coupled. The guide member 27 is disposed along sliding direction of the at least one movable core 15. The guide member 27 includes a pair of rail blocks 29 spaced apart from each other.

Here, the at least one support rod 25 includes a slide portion 26 provided in a lower portion. The slide portion 26 is slidably coupled to the guide member 27. The slide portion 26 is coupled to the guide member 27 to be capable of slipping along a sliding direction of the at least one movable core 15.

Referring to FIG. 1 to FIG. 7, in an embodiment, the at least one main ejecting block 30 is configured to firstly eject the molded product 1.

The at least one main ejecting block 30 is coupled to the fixed core 14 to be movable in the vertical direction. The at least one main ejecting block 30 penetrates the fixed core 14 and is movable in the vertical direction. In addition, the at least one main ejecting block 30 is connected to the ejecting plate 20, and is vertically movable together with the ejecting plate 20.

The at least one main ejecting block 30 is fixed to the ejecting plate 20 through at least one connection rod 31. Here, the at least one main ejecting block 30 together with the fixed core 14 and the at least one movable core 15 is involved in molding of the product 1 of the preset shape.

Furthermore, the at least one main ejecting block 30 forms an inclined surface 33 for guiding the movement of the at least one movable core 15, in a lower portion (refer to FIG. 5). That is, the at least one movable core 15 may move in the inclined direction along the inclined surface 33.

Referring to FIG. 1 to FIG. 7, in an embodiment, when the at least one main ejecting block 30 firstly ejects the entire product 1, the sub-ejecting block 50 is configured to secondly eject the protrusion molded part (e.g., boss or hook) of the product 1.

The sub-ejecting block 50 is coupled to the at least one main ejecting block 30 to be movable in the vertical direction. The sub-ejecting block 50 penetrates the at least one main ejecting block 30 and is movable in the vertical direction. In addition, the sub-ejecting block 50 may be moved in the vertical direction by the operating force delivery unit 70 that is further described later.

Here, the sub-ejecting block 50 together with the fixed core 14, the at least one movable core 15, and the at least one main ejecting block 30 are involved in molding of the product 1 of the preset shape.

The sub-ejecting block 50 may be mounted to a mounting hole 35 vertically penetrating the at least one main ejecting block 30. The mounting hole 35 may support the sub-ejecting block 50 through a step. A lower portion of the sub-ejecting block 50 protrudes from a lower portion of the at least one main ejecting block 30 through the mounting hole 35.

Referring to FIG. 1 and FIG. 5, in an embodiment, when ejecting the product 1, the operating force delivery unit 70 is configured to apply an operational force to the sub-ejecting block 50 by the movement of the at least one movable core 15. Here, the at least one movable core 15 is a source for generating the operational force, and the operational force is a force to move the sub-ejecting block 50 upward.

The operating force delivery unit 70 is installed on the at least one main ejecting block 30 at a position corresponding to the at least one movable core 15.

Figure 8:
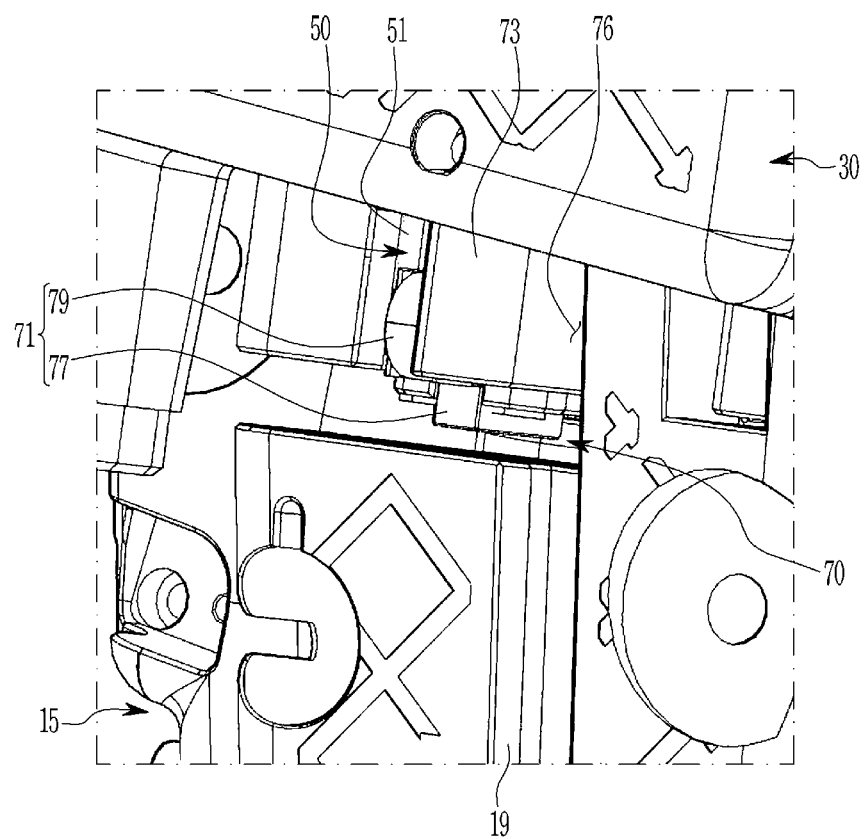
FIG. 8 and FIG. 9 illustrate an operating force delivery unit applied to an ejecting apparatus of an injection molding mold according to an embodiment.
Figure 9:
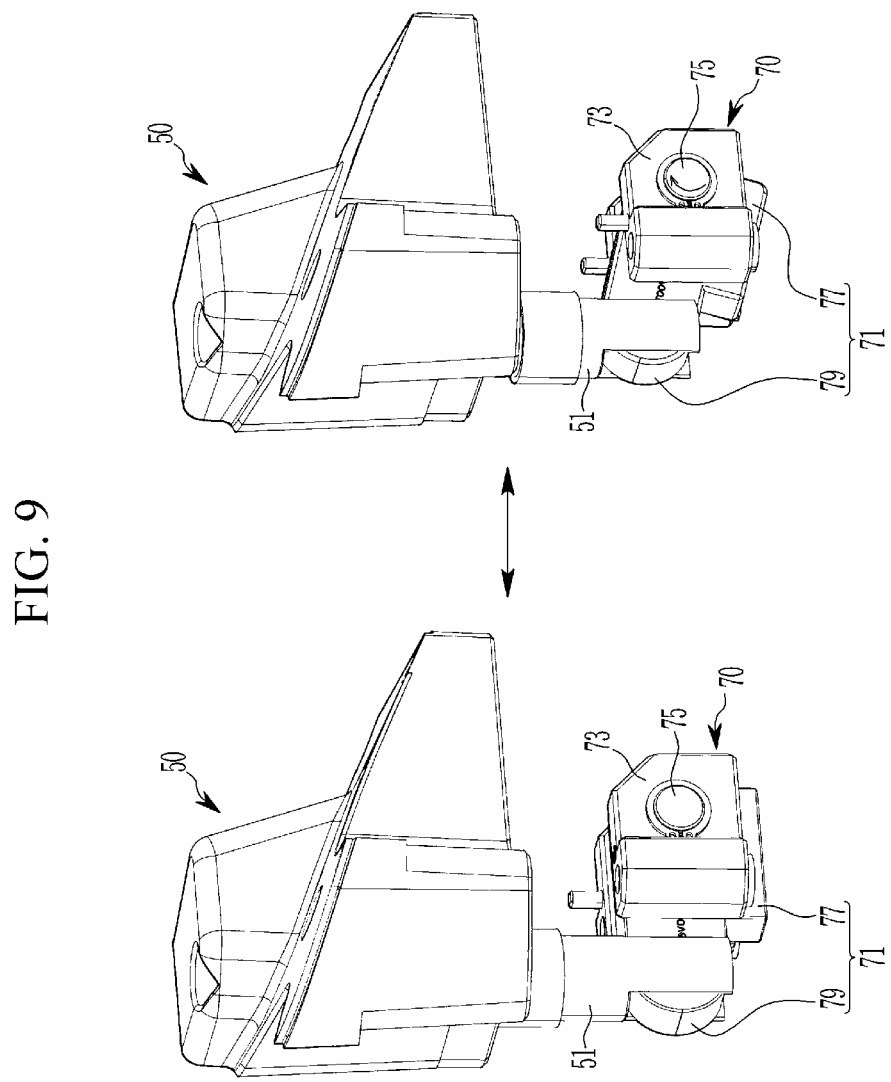

FIG. 8 and FIG. 9 illustrate an operating force delivery unit applied to an ejecting apparatus of an injection molding mold according to an embodiment.

Referring to FIG. 1 and FIG. 5, and also to FIG. 8 and FIG. 9, the operating force delivery unit 70 according to an embodiment includes a hinged block 71 rotatably coupled to the at least one main ejecting block 30.

The hinged block 71 is configured to be capable of swing by striking (e.g., actuating or moving) of the at least one movable core 15. The hinged block 71 is in sliding contact (e.g., cam contact) with the lower portion of the sub-ejecting block 50. The hinged block 71 may be struck by a striking portion 16 formed in the at least one movable core 15.

The operating force delivery unit 70 according to an embodiment may convert a rotational movement of the hinged block 71 into a linear movement of the sub-ejecting block 50 in the vertical direction. For such, the hinged block 71 is provided in a cam shape, in more detail, in the shape of a flat surface cam.

In more detail, the hinged block 71 is rotatably hinge-coupled to a hinge mount portion 73 provided in the lower portion of the at least one main ejecting block 30. The hinged block 71 may be rotatably coupled to the hinge mount portion 73 through a hinge pin 75.

The hinged block 71 may be disposed in a locating space 76 formed in the at least one movable core 15, together with the hinge mount portion 73.

Meanwhile, the sub-ejecting block 50 includes a cam follower 51 that is in sliding contact (e.g., cam contact) with the hinged block 71 at a position corresponding to the hinged block 71.

The cam follower 51 is provided in the lower portion of the sub-ejecting block 50, and protrudes toward the hinged block 71 through the mounting hole 35 of the at least one main ejecting block 30.

Figure 10:
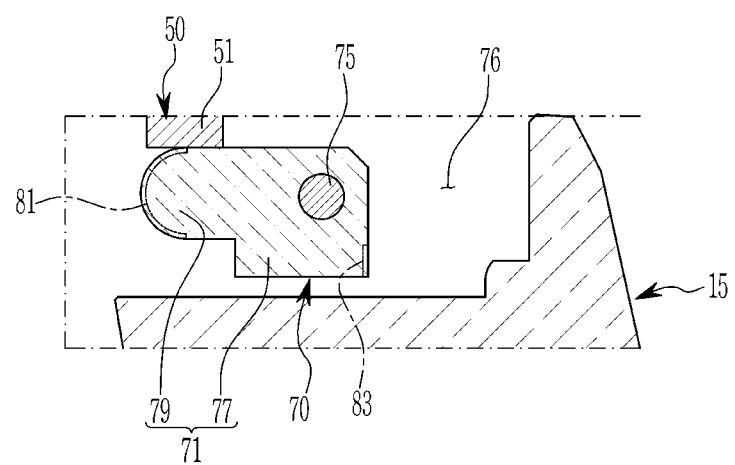
FIG. 10 illustrates a hinged block of operating force delivery unit applied to an ejecting apparatus of an injection molding mold according to an embodiment.

Furthermore, as shown in FIG. 10, the hinged block 71 includes a lever portion 77 and a cam drive portion 79.

The lever portion 77 is a portion that is struck by the striking portion 16 of the at least one movable core 15, and may be rotatably coupled to the hinge mount portion 73 through the hinge pin 75.

In addition, the cam drive portion 79 is a portion that is in sliding contact (e.g., cam contact) with the cam follower 51 of the sub-ejecting block 50, and may be integrally formed with the lever portion 77. In an example, the cam drive portion 79 is formed in a round shape.

Here, the cam drive portion 79 includes a first heat treated surface 81 that is heat treated. The first heat treated surface 81 is a surface that is heat treated by a heat treatment method known to a person skilled in the art, and may be formed as a sliding contact surface that is in sliding contact (e.g., cam contact) with the cam follower 51.

In addition, the lever portion 77 includes a second heat treated surface 83 that is heat treated. The second heat treated surface 83 is a surface that is heat treated by a heat treatment method known to a person skilled in the art, and may be formed as a striking surface that is struck by the striking portion 16 of the at least one movable core 15.

Hereinafter, an operation of the ejecting apparatus 100 of an injection molding mold according to an embodiment configured as described above is described in detail with reference to the drawings.

Figure 11:
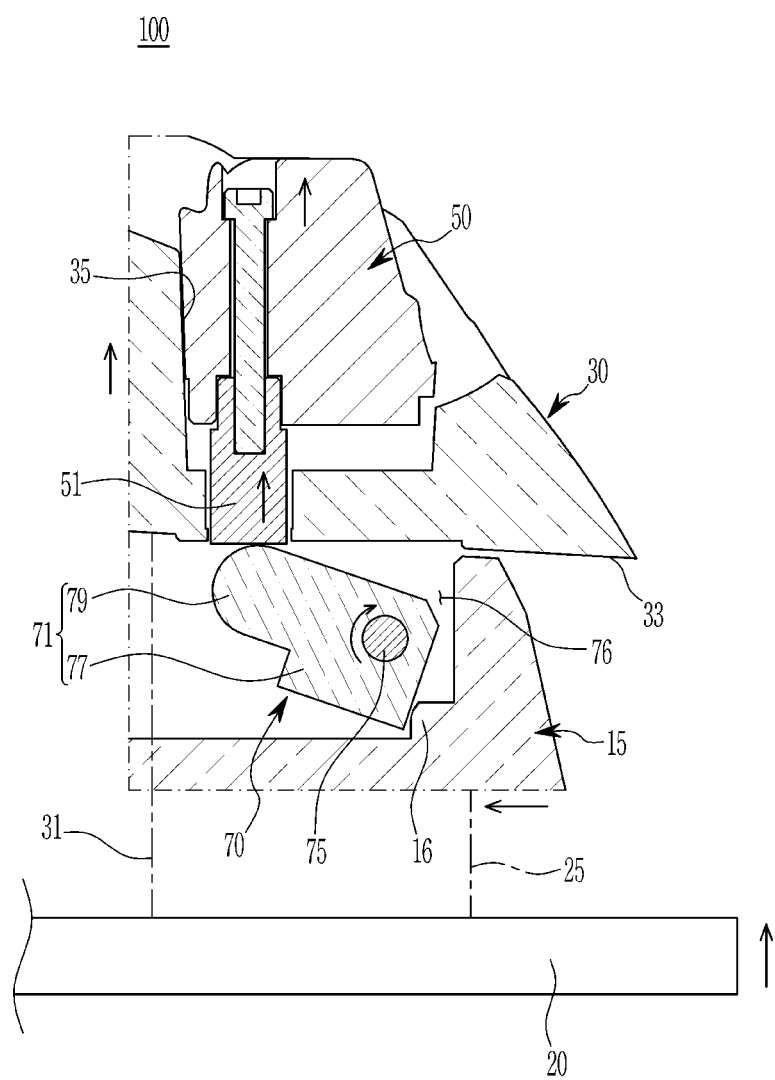
FIG. 11 is a cross-sectional view to illustrate an operation of an ejecting apparatus of an injection molding mold according to an embodiment.

FIG. 11 is a cross-sectional view to illustrate an operation of an ejecting apparatus of an injection molding mold according to an embodiment.

First, in an embodiment, the upper die 12 is moved downward, and pressed against (e.g., merged with) the lower die 11. Here, a cavity in a desired shape of the product 1 is formed between the lower die 11 and the upper die 12.

Here, as shown in FIG. 5, the ejecting plate 20 is in a state of being moved downward by the operation of the ejecting activator 21. In addition, as the ejecting plate 20 is moved downward, the at least one movable core 15 is in a state of being moved backward along the guide rail 18 of the fixed core 14 and the guide member 27 of the ejecting plate 20.

In addition, as the ejecting plate 20 is moved downward, the at least one main ejecting block 30 is in a state of being moved downward through the at least one connection rod 31.

Furthermore, the sub-ejecting block 50 is seated on the mounting hole 35 of the at least one main ejecting block 30 by its own weight. In addition, the cam follower 51 of the sub-ejecting block 50 and the cam drive portion 79 of the hinged block 71 are in sliding contact (e.g., cam contact) with each other.

In such a state, when the plastic molten resin is injected into the cavity between the lower die 11 and the upper die 12 that are in tight contact each other, the plastic molten resin may be molded into the product 1 of the preset shape as it cools (or hardens).

When the injection molding of the product 1 is completed, the upper die 12 is moved upward, and becomes spaced away from (e.g., diverged from) the lower die 11. Then, as shown in FIG. 11, the product 1 completed with the injection molding is withdrawn (e.g., ejected) from the lower die 11.

In more detail of the ejecting process of the product 1, firstly, the ejecting plate 20 is moved upward by the operation of the ejecting activator 21. Then, the at least one main ejecting block 30 is moved upward through the at least one connection rod 31.

Simultaneously, as the ejecting plate 20 is moved upward, the at least one movable core 15 moves forward along the guide rail 18 of the fixed core 14 and the guide member 27 of the ejecting plate 20.

Here, the at least one movable core 15 moves forward in the inclined direction along the inclined surface 33 of the at least one main ejecting block 30. At this time, the at least one movable core 15 may move forward along the guide member 27 through the at least one support rod 25 and the slide portion 26.

When the at least one movable core 15 moves forward, the striking portion 16 of the at least one movable core 15 strikes the lever portion 77 of the hinged block 71.

Striking of the lever portion 77 takes place in the locating space 76 of the at least one movable core 15. At this time, since the striking portion 16 strikes the second heat treated surface 83 of the lever portion 77, the lever portion 77 is not broken (or damaged) by the striking force of the striking portion 16.

Then, the hinged block 71 is rotated upward through the hinge pin 75. Accordingly, the cam drive portion 79 of the hinged block 71 raises the sub-ejecting block 50 upward, while slipping on the cam follower 51 of the sub-ejecting block 50. At this time, since the first heat treated surface 81 of the cam drive portion 79 slips on the cam follower 51, the cam drive portion 79 is not broken (or damaged) by the frictional force with respect to the cam follower 51.

Here, the sub-ejecting block 50 is moved upward through the mounting hole 35 of the at least one main ejecting block 30. At this time, the sub-ejecting block 50 is moved by a stroke larger than the stroke of the at least one main ejecting block 30.

Therefore, the at least one main ejecting block 30 and the sub-ejecting block 50 may firstly push the entire product 1 upward, secondly push the protrusion molded part (e.g., boss or hook) of the product 1 upward, and eject the product 1 from the lower die 11.

According to the ejecting apparatus 100 of an injection molding mold according to an embodiment, the ejecting operational force may be applied to the sub-ejecting block 50 through the at least one movable core 15 and the hinged block 71 that are cooperative by the ejecting plate 20.

Therefore, according to the ejecting apparatus 100 of an injection molding mold according to an embodiment, the conventional ejecting rod and guide rod may be removed, and an extra machining for the ejecting plate 20 is not necessary. Accordingly, according to the ejecting apparatus 100 of an injection molding mold according to an embodiment, the manufacturing cost and manufacturing labor of the injection molding mold 10 may be reduced.

In addition, according to the ejecting apparatus 100 of an injection molding mold according to an embodiment, since the ejecting operation of the sub-ejecting block 50 takes place within a preset operation range of the at least one movable core 15, the design degree of freedom of the injection molding mold 10 may be improved.

Accordingly, according to the ejecting apparatus 100 of an injection molding mold according to an embodiment, since the optimal ejecting performance may be secured, factory utilization rate and the mass productivity of the product may be improved.

Furthermore, according to the ejecting apparatus 100 of an injection molding mold according to an embodiment, since major frictional regions required for the ejecting the sub-ejecting block 50 are heat treated, durability of the injection molding mold 10 may be improved, and maintenance cost and labor for the injection molding mold 10 may be reduced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: product
10: injection molding mold
11: lower die
12: upper die
13: die body
14: fixed core
15: movable core
16: striking portion
17: die base
18: guide rail
19: rail groove
20: ejecting plate
21: ejecting activator
23: hydraulic pressure cylinder
25: support rod
26: slide portion
27: guide member
29: rail block
30: main ejecting block
31: connection rod
33: inclined surface
35: mounting hole
50: sub-ejecting block
51: cam follower
70: operating force delivery unit
71: hinged block
73: hinge mount portion
75: hinge pin
76: locating space
77: lever portion
79: cam drive portion
81: first heat treated surface
83: second heat treated surface
100: ejecting apparatus of injection molding mold

What is claimed is:

1. An ejecting apparatus for ejecting a molded product from an injection molding mold, comprising:
    an ejecting plate on a lower die of the injection molding, the ejecting plate configured to be movable in a vertical direction;
    at least one main ejecting block coupled to a fixed core on the lower die, the at least one main ejecting block configured to be movable in the vertical direction and connected to the ejecting plate;
    a sub-ejecting block coupled to the at least one main ejecting block, the sub-ejecting block configured to be movable in the vertical direction; and
    an operating force applier coupled to the at least one main ejecting block and configured to apply operational force to the sub-ejecting block through at least one movable core slidably coupled to the fixed core and the ejecting plate,
    wherein the ejecting plate comprises a guide member to which at least one support rod connected to the at least one movable core is slidably coupled,
    wherein the at least one support rod comprises a slide portion slidably coupled to the guide member such that the at least one movable core is slidably movable along a guide rail installed inclined on the fixed core,
    wherein the at least one movable core is slidably coupled to the guide rail through a rail groove, and configured to move along an inclined surface formed on the at least one main ejecting block,
    wherein the operating force applier comprises a hinged block hinge-coupled to the at least one main ejecting block, the hinged block configured to swing by striking of the at least one movable core, the hinged block being in sliding contact with the sub-ejecting block,
    wherein the hinged block comprises a lever portion configured to be struck by a striking portion formed in the at least one movable core, and
    wherein, by an upward operation of the ejecting plate, the at least one movable core slides along the guide rail, horizontally relative to the at least one main ejecting block, to become in contact with the hinged block, and then the hinged block is rotated by the at least one movable core so that the sub-ejecting block is operated upward to eject the molded product from the injection molding mold.

2. The ejecting apparatus of claim 1, wherein the hinged block comprises a cam shape configured to convert rotational movement of the hinged block into linear movement of the sub-ejecting block in the vertical direction.

3. The ejecting apparatus of claim 1, wherein the at least one main ejecting block is fixed to the ejecting plate through at least one connection rod.

4. The ejecting apparatus of claim 1, wherein the sub-ejecting block is mounted on a mounting hole formed in the at least one main ejecting block, and a lower portion of the sub-ejecting block protrudes toward the hinged block through the mounting hole.

5. The ejecting apparatus of claim 1, wherein the at least one main ejecting block comprises a hinge mount portion provided in a lower portion, and the hinged block is rotatably coupled to the hinge mount portion through a hinge pin.

6. The ejecting apparatus of claim 1, wherein the sub-ejecting block comprises a cam follower that is in sliding contact with the hinged block.

7. The ejecting apparatus of claim 6, wherein the hinged block comprises a cam drive portion in a round shape in sliding contact with the cam follower.

8. The ejecting apparatus of claim 7, wherein the cam drive portion comprises a first heat treated surface that is heat treated.

9. The ejecting apparatus of claim 1, wherein the lever portion comprises a second heat treated surface that is heat treated.

10. The ejecting apparatus of claim 1, wherein the hinged block is disposed in a locating space formed in the at least one movable core.

11. An ejecting apparatus of an injection molding mold, comprising:
   an upper die of the injection molding mold;
   a lower die of the injection molding mold, the lower die comprising a moveable core;
   an ejecting plate on the lower die, the ejecting plate configured to be movable in a vertical direction;
   a main ejecting block connected to the ejecting plate, the main ejecting block configured to be movable in the vertical direction;
   a sub-ejecting block coupled to the main ejecting block, the sub-ejecting block configured to be movable in the vertical direction; and
   a hinged block hinge-coupled to the main ejecting block and configured to apply operational force to the sub-ejecting block through the moveable core slidably coupled to the ejecting plate.

12. The ejecting apparatus of claim 11, wherein the hinged block is configured to swing by striking of the moveable core, the hinged block being in sliding contact with the sub-ejecting block.

13. The ejecting apparatus of claim 11, wherein the hinged block comprises a cam shape configured to convert rotational movement of the hinged block into linear movement of the sub-ejecting block in the vertical direction.

14. The ejecting apparatus of claim 11, wherein the main ejecting block is fixed to the ejecting plate through at least one connection rod.

* * * * *

UNITED STATES PATENT AND TRADEMARK OFFICE
CERTIFICATE OF CORRECTION

PATENT NO. : 12,257,753 B2
APPLICATION NO. : 18/192443
DATED : March 25, 2025
INVENTOR(S) : Weonseok Yang Page 1 of 1

It is certified that error appears in the above-identified patent and that said Letters Patent is hereby corrected as shown below:

In the Claims

In Column 10, Line 24, Claim 1:
Change "an ejecting plate on a lower die of the injection molding,"
To --an ejecting plate on a lower die of the injection molding mold,--

Signed and Sealed this
Twenty-ninth Day of April, 2025

Coke Morgan Stewart
*Acting Director of the United States Patent and Trademark Office*